US010763529B2

(12) United States Patent
Ghezel-Ayagh et al.

(10) Patent No.: US 10,763,529 B2
(45) Date of Patent: Sep. 1, 2020

(54) PRESSURE BALANCING OF ANODE AND CATHODE IN A FUEL CELL SYSTEM

(71) Applicant: FuelCell Energy, Inc., Danbury, CT (US)

(72) Inventors: Hossein Ghezel-Ayagh, New Milford, CT (US); James B. Walzak, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 177 days.

(21) Appl. No.: 15/983,005

(22) Filed: May 17, 2018

(65) Prior Publication Data

US 2019/0356006 A1  Nov. 21, 2019

(51) Int. Cl.
| | |
|---|---|
| *H01M 8/04* | (2016.01) |
| *H01M 8/0606* | (2016.01) |
| *H01M 8/0662* | (2016.01) |
| *H01M 8/04089* | (2016.01) |
| *H01M 8/04111* | (2016.01) |

(52) U.S. Cl.
CPC ...... *H01M 8/0606* (2013.01); *H01M 8/04104* (2013.01); *H01M 8/04111* (2013.01); *H01M 8/0662* (2013.01)

(58) Field of Classification Search
CPC .............. H01M 8/0606; H01M 8/04104
See application file for complete search history.

(56) References Cited

U.S. PATENT DOCUMENTS

| 6,735,953 B1* | 5/2004 | Wolfe | .................... B64D 13/06 165/144 |
|---|---|---|---|
| 2013/0011757 A1* | 1/2013 | Perry | ................ H01M 8/04014 429/419 |

* cited by examiner

*Primary Examiner* — Olatunji A Godo
(74) *Attorney, Agent, or Firm* — Foley & Lardner LLP

(57) ABSTRACT

A fuel cell system includes a fuel cell having an anode configured to receive anode feed gas and output anode exhaust, and a cathode configured to receive cathode feed gas and output cathode exhaust. The system further includes a pressurizing assembly downstream from the anode and an oxidizer downstream from the anode. The cathode feed gas is the anode exhaust that has been compressed in the pressurizing assembly and reacted with air in the oxidizer.

20 Claims, 4 Drawing Sheets

PRESSURE BALANCING OF ANODE AND CATHODE IN A FUEL CELL SYSTEM

STATEMENT OF GOVERNMENT RIGHTS

This invention was made with Government support under Cooperative Agreement DE-FC26-00NT40798 awarded by the United States Department of Energy. The Government has certain rights in the invention.

BACKGROUND

The present application relates generally to the field of fuel cell systems and more specifically to a fuel cell system where pressure is balanced between an anode and cathode of a fuel cell in the system.

In conventional high-temperature fuel cells, the anode and cathode of a fuel cell operate at different pressures, which reduces fuel cell efficiency and reduces the operational life of the fuel cell. For example, when pressure in the anode is greater than pressure in the cathode, anode feed gas may leak (crossover) from the anode, across the membrane, and to the cathode. In this configuration, at least a portion of the anode feed gas is not utilized for electricity production within the fuel cell, thereby reducing operational efficiency of the fuel cell. The anode feed gas, which crosses over to the cathode may also oxidize (i.e., burn) within the cathode cavity, resulting in the loss of oxygen and an undesirable localized temperature increase, which shortens the operating life of the fuel cell. In contrast, if pressure in the cathode is greater than pressure in the anode, cathode feed gas may crossover to the anode, resulting in possible oxidation of the catalyst within the anode and/or oxidation of the fuel within the anode chamber, which also produces a localized temperature increase. In each of these cases, the crossover of feed gas to or from the cathode may damage the anode and reduce the operational life of the fuel cell.

It would be advantageous to provide a fuel cell system that balances the pressure between the anode and the cathode of a fuel cell. As will be appreciated by those reviewing the present disclosure, these and other advantages may be obtained using the exemplary embodiments disclosed herein.

SUMMARY

One embodiment relates to a fuel cell system, including a fuel cell having an anode configured to receive anode feed gas and output anode exhaust, and a cathode configured to receive cathode feed gas and output cathode exhaust. The system further includes a pressurizing assembly downstream from the anode and an oxidizer downstream from the anode. The cathode feed gas is the anode exhaust that has been compressed in the pressurizing assembly and reacted with air in the oxidizer.

Another embodiment relates to a fuel cell system, including a fuel cell having an anode configured to receive anode feed gas and output anode exhaust, and a cathode configured to receive cathode feed gas and output cathode exhaust. The system further includes a blower configured to receive the anode exhaust from the anode and to compress or accelerate the anode exhaust. The system further includes an oxidizer configured to receive the anode exhaust from the blower, react the anode exhaust with air, and output the cathode feed gas to the cathode.

Another embodiment relates to a method of balancing pressure between an anode and a cathode in a fuel cell, including providing a fuel cell having an anode outputting anode exhaust, and a cathode outputting cathode exhaust. The method further includes oxidizing the anode exhaust in the oxidizer to form a cathode feed gas and increasing pressure of the anode exhaust or the cathode feed gas in a pressurizing assembly downstream from the anode. The method further includes feeding the cathode feed gas to the cathode.

DETAILED DESCRIPTION

Referring to the FIGURES generally, a fuel cell system is shown according to various exemplary embodiments. The configurations shown in the FIGURES are based on a Molten Carbonate Fuel Cell ("MCFC"). However, it should be understood that other types of fuel cells may be used instead of or in addition to an MCFC. For example, the fuel cell is a high-temperature fuel cell, which may include an MCFC, a Solid Oxide Fuel Cell ("SOFC"), or a Protonic Ceramic Fuel Cell ("PCFC"), each of which are made with ceramic materials. While ceramic is resilient to very high temperatures, a ceramic membrane structure may be more prone to forming leak paths between the anode and cathode, leading to feed gas crossover. The exemplary fuel cell systems shown in the present FIGURES include a particular type of MCFC, which includes internal reformation of the feed gas. This type of MCFC, which includes direct reformation of hydrocarbon fuels, such as methane, within the fuel cell anode is also referred to as a Direct Fuel Cell ("DFC"). In an MCFC generally, and a DFC specifically, anode exhaust output from the anode is oxidized and then fed as cathode feed gas to the cathode for operation of the fuel cell. In a conventional fuel cell system, pressure is lost as the anode exhaust is processed into cathode feed gas, resulting in a pressure imbalance across the fuel cell. However, as shown in the FIGURES, pressure is balanced between the anode and cathode according to various exemplary embodiments, as will be discussed below.

Figure 1:
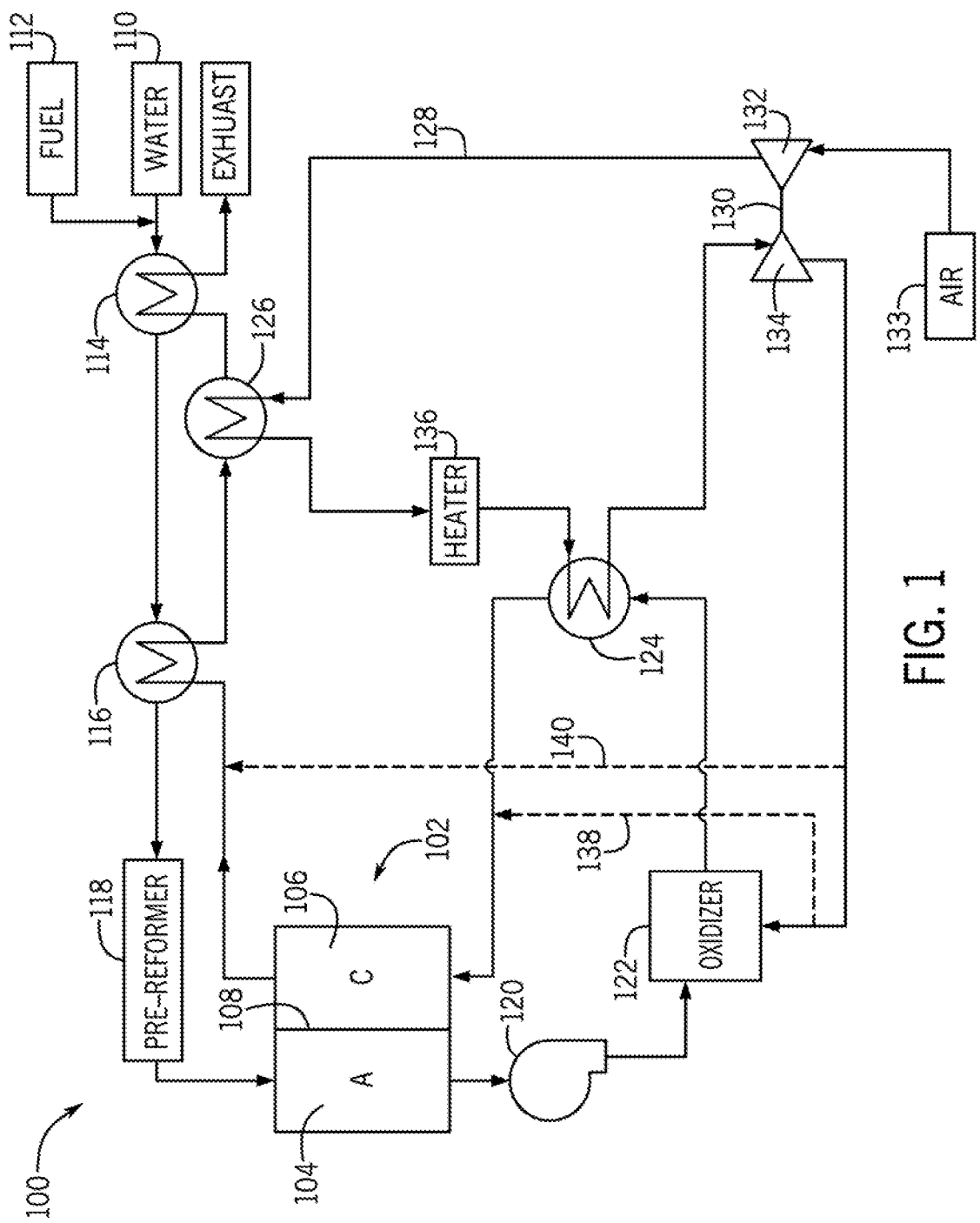
FIG. 1 is a schematic of a fuel cell system according to an exemplary embodiment.

Referring now to FIG. 1, a fuel cell system 100 is shown according to an exemplary embodiment. The system 100 includes a fuel cell 102 (e.g., DFC) having an anode 104 and a cathode 106 separated by a membrane 108. Water is provided from a water supply 110 and mixed with fuel (e.g., natural gas) provided from a fuel supply 112 to form a water-fuel mixture. The water-fuel mixture is fed to a vaporizer 114 (i.e., a first heat exchanger) in which heat is transferred to the water-fuel mixture, such that at least a portion of the water is vaporized into steam to form a steam-fuel mixture (i.e., a humidified fuel). The steam-fuel mixture is then output from the vaporizer 114 and fed to a pre-heater 116 (i.e., a second heat exchanger). Heat is transferred in the pre-heater 116 to the steam-fuel mixture, increasing the temperature of the steam-fuel mixture and forming a heated steam-fuel mixture. In some configurations, if a portion of the water is not converted into steam in the vaporizer 114, heat transferred in the pre-heater 116 may further or completely vaporize any remaining water output from the vaporizer 114. The heated steam-fuel mixture is then output from the pre-heater 116 and fed to a pre-reformer 118, where the heated steam-fuel mixture is reformed upstream from the anode 104 into an anode feed gas. The anode feed gas is then output from the pre-reformer 118 and fed to the anode 104.

After the anode feed gas is reacted electrochemically in the anode 104, anode exhaust is output from the anode 104 and fed to a pressurizing assembly 121, which increases the pressure of the anode exhaust. As shown in FIG. 1, the pressurizing assembly 121 includes a blower 120 (i.e., compressor), which compresses and accelerates the anode exhaust, increasing the pressure of the anode exhaust. The anode exhaust is then output at a higher pressure from the blower 120 and fed to an oxidizer 122, where it is reacted with air to form cathode feed gas. The cathode feed gas is then fed to a high-temperature recuperator 124 (i.e., a third heat exchanger). The oxidization process generates additional heat, which is transferred away from the cathode feed gas in the high-temperature recuperator 124. The cooled cathode feed gas is then output from the high-temperature recuperator 124 and fed to the cathode 106 for operation of the fuel cell 102.

Between the anode exhaust being output from the anode 104 and the cathode feed gas being fed to the cathode 106, pressure is lost from the system 100. For example, without the blower 120 in operation, the anode 104 may operate at an anode operating pressure $P_{anode}$ of approximately 20 inH$_2$O and the cathode 106 may operate at a cathode operating pressure $P_{cathode}$ of approximately 15 inH$_2$O. A pressure differential $P_{diff}$ in the fuel cell 102 is the difference between the anode operating pressure $P_{anode}$ and the cathode operating pressure $P_{cathode}$, and is the amount of pressure lost between the anode 104 and the cathode 106. In the foregoing example, the pressure differential $P_{diff}$ is approximately 5 inH$_2$O. This positive pressure differential $P_{diff}$ causes anode feed gas to transport (i.e., move, migrate, etc.) from the anode 104 to the cathode 106 without reacting electrochemically for production of electricity, thereby reducing the operational efficiency of the fuel cell 102. It should be noted that the more pressure lost between the anode 104 and the cathode 106, the larger the pressure differential $P_{diff}$. The pressure differential $P_{diff}$ is caused by the flow of the anode feed gas through different portions of the anode 104 (e.g., an anode inlet manifold, anode chamber, anode outlet manifold) and other ancillary pipes and connectors (e.g., fittings) that direct the flow of anode feed gas and/or anode exhaust to the oxidizer 122.

In a conventional fuel cell system, the cathode 106 is configured to operate at a pre-determined cathode operation pressure $P_{cathode}$ (e.g., 15 inH$_2$O). In order to compensate for this pressure loss, the anode 104 is supplied with anode feed gas at a higher pressure (e.g., 20 inH$_2$O) and operates at an anode operation pressure $P_{anode}$ that is higher than the cathode operation pressure $P_{cathode}$. The pressure of the anode feed gas may be controlled by regulating or adjusting the pressure of the fuel supply 112 to a fuel pressure $P_{fuel}$. For example, the fuel pressure $P_{fuel}$ may be substantially the same as or greater than the anode operation pressure $P_{anode}$, which is greater than the cathode operation pressure $P_{cathode}$. Generally, the fuel pressure $P_{fuel}$ cannot simply be lowered to reduce the pressure differential $P_{diff}$ because a minimum fuel pressure $P_{fuel}$ is required in order to supply a sufficient pre-determined volume of fuel through the fuel cell system for power generation.

As shown in FIG. 1, the blower 120 operates in order to compensate for the pressure loss between the anode 104 and the cathode 106 and thereby minimize or eliminate the pressure differential $P_{diff}$ in the fuel cell 102. According to an exemplary embodiment, the blower 120 increases the pressure of the anode exhaust by a certain amount of pressure to minimize the pressure loss between the anode 104 and the cathode 106 (e.g., substantially the same amount of pressure that is expected to be lost between the anode 104 and the cathode 106). In particular, the amount of pressure boost from the blower 120 is governed by a pressure map of streams starting from the anode feed gas, a pressure drop within the anode 104, a pressure drop in the anode exhaust passing through ancillary equipment connecting the anode 104 to the cathode 106, and a pressure drop within the cathode 106. In the configuration shown in FIG. 1, the pressure of the anode exhaust downstream from the blower 120 and being fed to the oxidizer 122 is higher than the anode operating pressure $P_{anode}$. According to another exemplary embodiment, the blower 120 may be positioned downstream from the oxidizer 122 and/or the high-temperature recuperator 124, and closer to the cathode 106. In this configuration, the blower 120 may receive cathode feed gas at a pressure less than the anode operating pressure $P_{anode}$, since the anode exhaust already experienced some pressure loss upstream from the blower 120, and at a pressure less than the cathode operating pressure $P_{cathode}$. The blower 120 then increases the pressure in the cathode feed gas to the cathode operating pressure $P_{cathode}$.

Referring still to FIG. 1, the cathode feed gas is fed from the high-temperature recuperator 124 to the cathode 106. After reacting the cathode feed gas in the cathode 106, cathode exhaust is output from the cathode 106 and fed to the pre-heater 116. Heat from the cathode exhaust is transferred in the pre-heater 116 to the steam-fuel mixture, as discussed above, lowering the temperature of the cathode exhaust. The cathode exhaust is output from the pre-heater 116 and fed to a low-temperature recuperator 126 (i.e., a fourth heat exchanger). Heat is transferred from the cathode exhaust in the low-temperature recuperator 126, as will be discussed in further detail below, further lowering the temperature of the cathode exhaust. The cathode exhaust is then fed from the low-temperature recuperator 126 to the vaporizer 114, in which heat is transferred from the cathode exhaust to the water-fuel mixture, as discussed above. The cathode exhaust is then output from the system 100.

Referring still to FIG. 1, the system 100 includes a turbine loop 128, according to an exemplary embodiment. The turbine loop 128 includes a turbine (i.e., a microturbine) 130, having a turbine inlet 132 and a turbine outlet 134. The turbine 130 is configured to receive air at the turbine inlet 132 from an air supply 133 and heat at least a portion of the air before feeding the air to the oxidizer 122 for reaction with the anode exhaust. Air from the air supply 133 is compressed in the turbine 130 (e.g., downstream from the turbine inlet 132) to a higher pressure than the air received at the turbine inlet 132. At the turbine outlet 134, air from the turbine 130 is depressurized, providing extra power in addition to the fuel cell-generated power.

As shown in FIG. 1, a first portion of the air is output from the turbine inlet 132 and fed to the low-temperature recuperator 126. Heat is transferred in the low-temperature recuperator 126 from the cathode exhaust to the first portion of air, increasing the temperature of the first portion of air. The first portion of air is then fed through a heater 136. The heater 136 may be operated during a start-up procedure and then disabled (e.g., switched to an "off" state) once the fuel cell system is fully operational and generating power. Similarly, the heater 136 may be operated (e.g., turned to an "on" state) in a power ramp-up condition, in which the system 100 quickly increases its power output. According to an exemplary embodiment, the heater 136 is disabled during normal, steady-state operation of the system 100 in order to maximize the operational efficiency of the system 100. The heater 136 may be an electric heater or other type of heater configured to increase the temperature of the first portion of air. The heated first portion of air (e.g., heated air) is then output from the heater 136 and fed to the high-temperature recuperator 124, in which heat is transferred from the cathode feed gas to the first portion of air, further increasing the temperature of the first portion of air and decreasing the temperature of the cathode feed gas. The high-temperature recuperator 124 decreases the temperature of the cathode feed gas exiting the oxidizer 122 before introducing the cathode feed gas to the cathode 106.

The first portion of air is output from the high-temperature recuperator 124 and fed back to the turbine 130 at the turbine outlet 134. A second portion of the air (e.g., the remaining air) in the turbine 130 is fed from the turbine inlet 132 directly to the turbine outlet 134, without passing through the turbine loop 128. The second portion of air is heated and/or compressed in the turbine 130 before being mixed again with the first portion of the air in the turbine outlet 134. For example, the turbine 130 may increase the pressure in the second portion of air, such that the mixed first and second portions of air in the turbine outlet 134 is at a higher pressure than the air at the turbine inlet 132.

As shown in FIG. 1, the air is output from the turbine outlet 134 and fed to the oxidizer 122 for reaction with the anode exhaust. In the oxidizer 122, the air is introduced from the turbine 130 in order to burn off (e.g., oxidize or combust) any remaining CO and/or $H_2$ in the anode exhaust before being fed to the cathode 106. Without the oxidizer 122, the system 100 may experience ignition (e.g., pre-ignition) of the $H_2$ left in the cathode feed gas, which would generate a flame extending upstream toward the cathode 106 and potentially damage the cathode 106 or may form localized hot spots proximate an inlet of the cathode 106, which may further damage the fuel cell 102. Furthermore, the anode exhaust may require thorough mixing with air at an inlet of the oxidizer 122. Without thorough mixing, the anode exhaust may have pockets of $H_2$ in increased concentration. If these pockets experience pre-ignition, the pockets would cause localized surges in temperature that would be greater than if the $H_2$ were evenly distributed and may lead to further damage to the system 100.

At a mixing point within the oxidizer 122, the anode exhaust upstream from the blower 120 and the air output from the turbine outlet 134 have equal pressures. In this configuration, the blower 120 operates to increase the pressure in the anode exhaust in order to equalize the pressure of the anode exhaust with the pre-determined pressure of the air from the turbine outlet 134. A typical pressure at the mixing point may be approximately 20 $inH_2O$. The pressure of the cathode gas may be at the cathode operating pressure $P_{cathode}$, which is approximately 15 $inH_2O$. In order to minimize the pressure differential $P_{diff}$ (e.g., $P_{diff}=0$), the blower 120 needs to maintain a pressure of 15 $inH_2O$ and to increase the pressure of the anode gas (e.g., the anode operating pressure $P_{anode}$) by approximately 5 $inH_2O$. The precise control of the pressure differential $P_{diff}$ to equalize pressure between the anode 104 and the cathode 106 may be performed by controlling and adjusting the speed of the blower 120 during operation of the system 100. According to an exemplary embodiment, the speed of the blower 120 may be adjusted automatically based on a measured or calculated pressure differential $P_{diff}$, such that the speed of the blower 120 increases the further the pressure differential $P_{diff}$ increases above a desired amount (e.g., zero).

According to an exemplary embodiment, the system 100 includes a first bypass stream 138, in which a portion of the air output from the turbine 130 bypasses the oxidizer 122 and is mixed directly with the cathode feed gas (e.g., upstream from the cathode 106 and downstream from the oxidizer 122 and/or the high-temperature recuperator 124) without reacting in the oxidizer 122. In this configuration, the first bypass stream 138 allows for control of the temperature of effluent from the oxidizer 122 and the temperature at an inlet of the high temperature recuperator 124, while providing additional oxygen to the cathode feed gas fed to the cathode 106. For example, the first bypass stream 138 may be mixed with the cathode feed gas to provide cathode feed gas to the cathode 106 with a desired oxygen content. The first bypass stream 138 further allows for increasing the temperature of the high-temperature recuperator 124 for improved heat recovery by the air in the turbine loop 128.

The mixture of the first bypass stream 138 with effluent from the high-temperature recuperator 124, forming the cathode feed gas, may also change the pressure of the cathode feed gas before it is fed to cathode 106. For example, if the pressure of the first bypass stream 138 is less than the pressure of the effluent from the high-temperature recuperator 124, then mixture of the first bypass stream 138 into the cathode feed gas causes the pressure of the cathode feed gas to drop. In this configuration, the pressure drop may be compensated with the use of the blower 120 increasing pressure of either the anode exhaust or the cathode feed gas. According to some embodiments, the introduction of the first bypass stream 138 may contribute the pressure loss between the anode 104 and the cathode 106 as discussed above. According to another exemplary embodiment, the introduction of the first bypass stream 138 may result in increasing the pressure of the cathode feed gas, thereby reducing the load on the blower 120 to compensate for pressure loss in the system 100.

FIG. 1 further shows a second bypass stream 140, in which a portion of the air output from the turbine 130 bypasses both the oxidizer 122 and the cathode 106 and is mixed directly with cathode exhaust downstream from the cathode 106. As shown in FIG. 1, the second bypass stream 140 mixes with the cathode exhaust upstream from the pre-heater. The second bypass stream 140 may be used in configurations in which the air flow through the turbine 130 is greater than the air required for operation of the fuel cell 102. In this configuration, the turbine 130 operates at its designed air flow rate without compromising the efficiency of the operation of the fuel cell 102 by supplying to much air to the fuel cell 102. For example, if too much oxygen is provided to either of the oxidizer 122 or the cathode 106 from the turbine 130, excess air may be passed through the second bypass stream 140 rather than stopping and restarting the turbine 130 or operating the turbine 130 at a slower and less efficient power rating, which may increase operating costs of the system 100.

Further, the second bypass stream 140 may be used to control a ratio of oxygen and carbon dioxide concentrations in the cathode feed gas, which may be an important parameter in the performance of MCFCs. The first and second bypass streams 138, 140 may also be provided in order to control the oxidization process in the oxidizer 122. For example, oxidization and therefore formation of cathode feed gas may be slowed down by reducing the amount of air fed to the oxidizer 122. Similarly, if too much oxygen is being provided to either the oxidizer 122 or the cathode 106 from operation of the turbine 130, excess air may be passed through the second bypass stream 140 rather than stopping and restarting the turbine 130 or operating the turbine 130 at a slower and less efficient power rating, which may increase operating costs of the system 100.

Because the second bypass stream 140 is heated in either the turbine loop 128 or the turbine 130 itself, by mixing the second bypass stream 140 with the cathode exhaust, the second bypass stream 140 increases the sensible heat content of the cathode exhaust, which provides more heat for transferring to the anode feed gas through the pre-heater 116 and the vaporizer 114. The additional heat in the cathode exhaust may also be recycled to the turbine loop 128 through the low-temperature recuperator 126. While FIG. 1 shows the second bypass stream 140 mixing with the cathode exhaust upstream from the pre-heater 116, it should be recognized that the second bypass stream 140 may mix with the cathode exhaust at any point downstream from the cathode 106.

Figure 2:
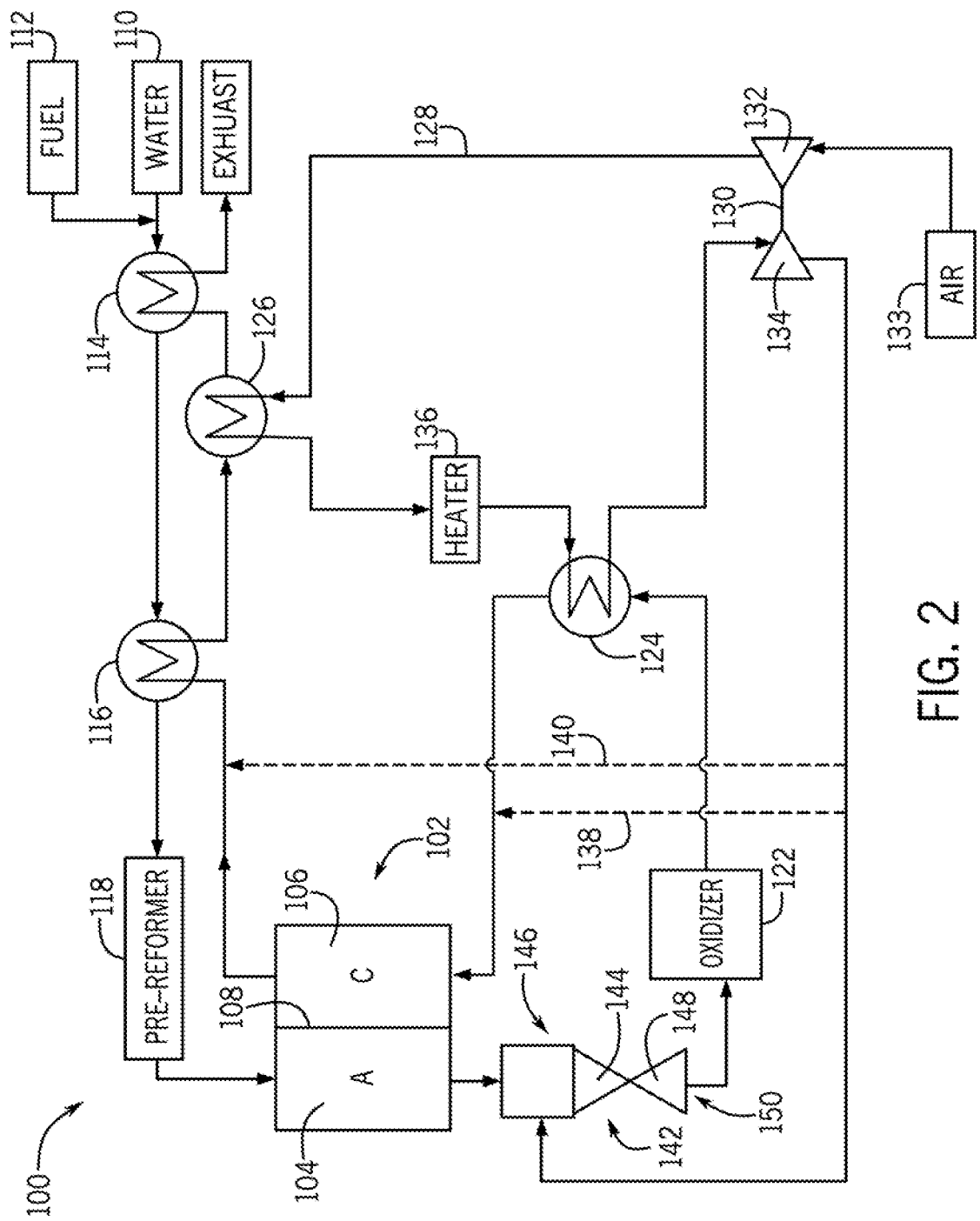
FIG. 2 is a schematic of a fuel cell system according to another exemplary embodiment.

Referring now to FIG. 2, the system 100 is shown according to another exemplary embodiment. The system 100 shown in FIG. 2 may be substantially the same as in FIG. 1, except as described below. The pressurizing assembly 121 includes an eductor 142 (i.e., a gas ejector, a venturi pump, etc.) disposed downstream from the anode 104 and configured to receive the anode exhaust therefrom. The eductor defines a nozzle 144 at an inlet end 146 thereof and a diffuser 148 at an outlet end 150 thereof. Air is fed from the turbine 130 to the nozzle 144 at a pressure of approximately 30 $inH_2O$ or higher and acts as the motive fluid to draw anode exhaust into the nozzle 144 from the anode 104. Generally, a valve controls the flow of air into the nozzle 144, which then controls the flow of anode exhaust into the nozzle 144. In this configuration, the air is fed to the eductor 142 and mixed with anode exhaust upstream from the oxidizer 122, rather than being fed directly to the oxidizer 122 as described with respect to FIG. 1. As shown in FIG. 2, the air and the anode exhaust are fed to the nozzle 144 and pass through the rest of the eductor 142 where they are mixed. Specifically, the mixture of air and anode exhaust is compressed in the nozzle 144 as a diameter of the nozzle 144 decreases as the mixture moves downstream. This change in diameter causes the mixture to accelerate as it is fed to the diffuser 148.

A diameter of the diffuser 148 increases as the mixture moves downstream, causing the mixture to decelerate as it is output from the eductor 142 and fed to the oxidizer 122. The movement of the mixture of air and anode exhaust through the eductor 142 thoroughly mixes the air and the anode exhaust to form a substantially homogeneous mixture for introduction to the oxidizer 122. In this configuration, localized temperature surges are minimized or eliminated in the event that the system 100 experiences pre-ignition. The eductor 142 may increase pressure in the anode exhaust by approximately 8 $inH_2O$, similarly to the blower 120 described in FIG. 1, thereby reducing the pressure differential $P_{diff}$ in the fuel cell 102. It should be noted that because the blower 120 handles anode exhaust rather than air, tight tolerances and extra precautions may be taken to ensure that anode exhaust does not leak from the blower 120. Further, the blower 120 must be a high-temperature blower, configured to receive anode exhaust at approximately 500-500° C. In contrast, the eductor 142 is a passive system for increasing pressure in the anode exhaust and may be simpler to seal to ensure that anode exhaust does not leak from the system 100.

Figure 3:
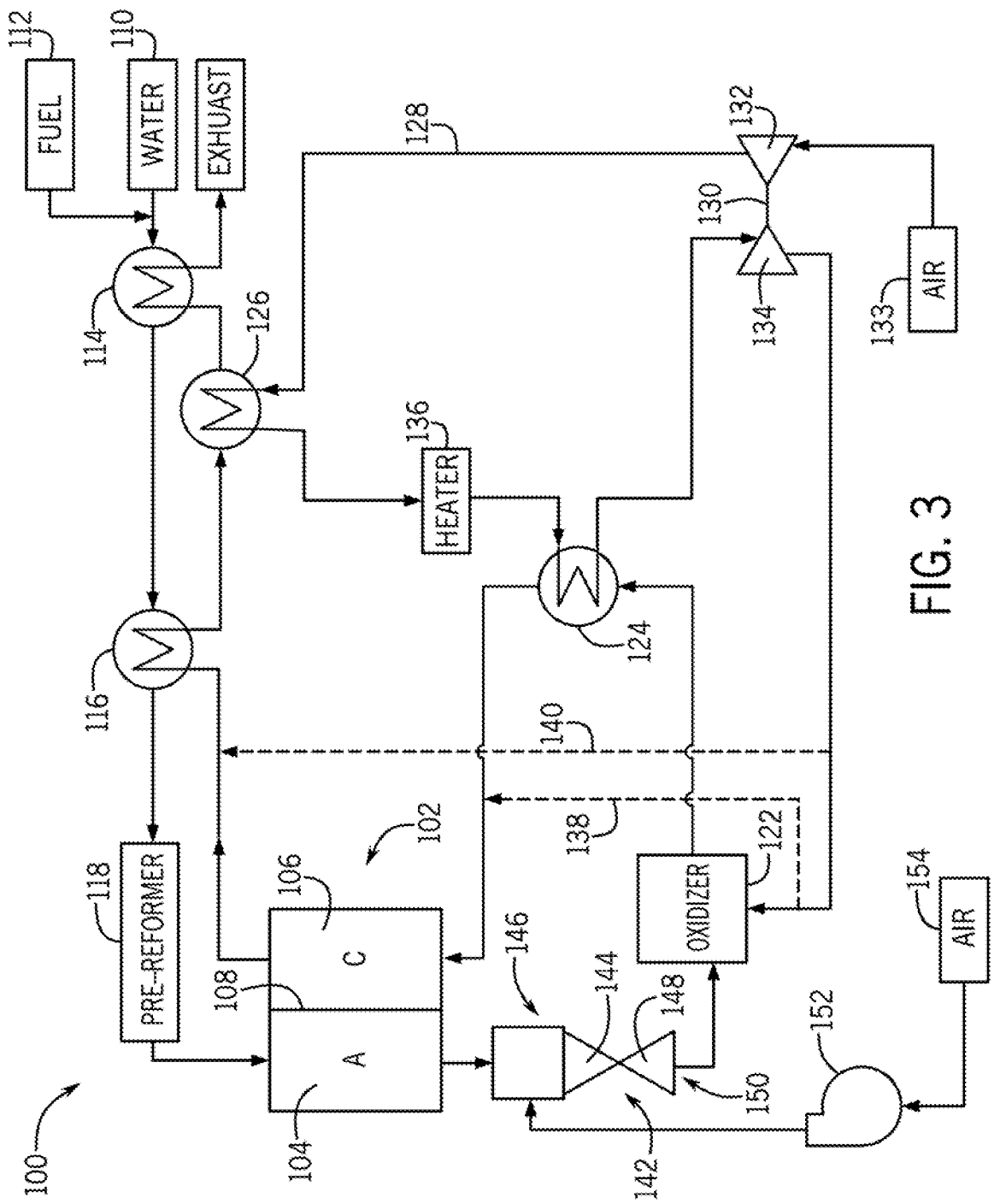
FIG. 3 is a schematic of a fuel cell system according to another exemplary embodiment.

The blower 120 and the eductor 142 may also differ in the energy effects on the system 100. According to an exemplary embodiment, the blower 120 operates at a power rating of approximately 2-3 kW that must be added to the system 100 to operate the system 100. Referring to FIG. 2, the eductor 142 is a passive system and does not require an external energy input to use the eductor 142. However, the volume flow rate of air output from the turbine 130 to the eductor 142 may be less than the volume flow rate of the air capable of being passed through the nozzle 144. This difference in volume flow rates may lead to the eductor 142 causing back pressure on the turbine 130. Back pressure may cause the turbine 130 to operate less efficiently and therefore reduce the operational efficiency of the turbine 130. For example, the eductor 142 may cause parasitic power losses in the system 100 of approximately 3-4 kW Referring now to FIG. 3, the system 100 is shown according to another exemplary embodiment. The system 100 shown in FIG. 3 may be substantially the same as in FIGS. 1 and 2, except as described below. The pressurizing assembly 121 includes the eductor 142 disposed between the anode 104 and the oxidizer 122. However, the air from the turbine 130 is fed directly to the oxidizer as provided in FIG. 1, rather than to the eductor 142, upstream from the oxidizer 122. As shown in FIG. 3, the system 100 includes a blower 152 (i.e., compressor) configured to receive air from an air supply 154 (i.e., a second air supply). The air may be provided in the air supply 154 at an ambient pressure. While FIG. 3 shows the system 100 having two air supplies 133, 154, it should be understood that the turbine 130 and the blower 152 may receive air from the same air supply.

The blower 152 accelerates the air or increases the air pressure before introducing the air to the nozzle 144 of the eductor 142. The air from the blower 152 then acts as the motive fluid, drawing the anode exhaust into the eductor 142. The blower 152 may be operated such that the eductor increases pressure in the anode exhaust by approximately 5 $inH_2O$. It should be noted that because the air output from the turbine outlet 134 is being fed directly to the oxidizer 122 rather than to the eductor 142, the turbine 130 is less susceptible to back pressure, reducing or eliminating the parasitic power losses caused by the turbine 130 back pressure. However, the blower 152 may require a power input of approximately 3-4 kW in order to compress the air from its ambient pressure for introduction to the eductor 142. The blower 152 in FIG. 3 handles only air rather than the blower 120 in FIG. 1, which handles anode exhaust. By isolating the blower 152 from direct exposure and handling of anode exhaust, it becomes less important that the blower 152 prevent leakages. Accordingly, this configuration allows for installation of a less expensive conventional blower 152 with larger tolerances as air leaks in the blower 152 will not have the same dangerous effects of potential anode exhaust leaks. The conventional blower 152 may also be smaller because it requires less sealing structure, and therefore reduces the overall size and complexity of the system 100.

Figure 4:
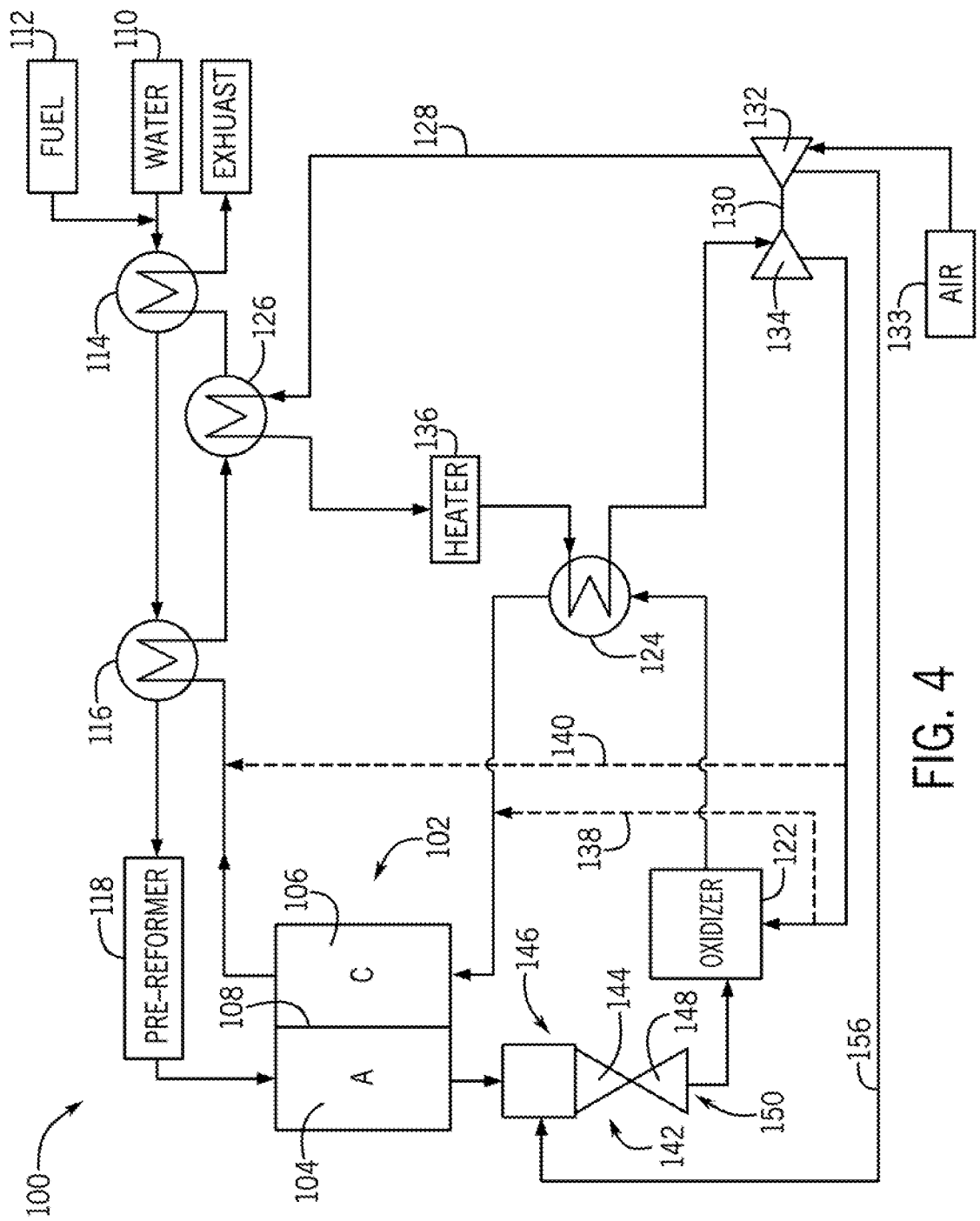
FIG. 4 is a schematic of a fuel cell system according to another exemplary embodiment.

Referring now to FIG. 4, the system 100 is shown according to another exemplary embodiment. The system 100 shown in FIG. 4 may be substantially the same as in FIG. 3, except as described below. The pressurizing assembly 121 includes the eductor 142 described above. In order to supply air to the eductor 142 as a motive fluid to draw anode exhaust through the eductor 142, a slip stream 156 (e.g., a portion of the air from the air supply 133, which is compressed in the compressor section of the turbine inlet 132 and separated from the turbine loop 128) is output from the turbine inlet 132 (e.g., before the air passes either directly to the turbine outlet 134 or through the turbine loop 128) directly to the nozzle 144 of the eductor 142. It should be understood that the slip stream 156 is a stream, which is split from a main stream (in this case the turbine loop 128) and is substantially smaller than the main stream. The air at the turbine inlet 132 increases in pressure before being output through the slip stream 156. For example, the slip stream 156 may be provided to the eductor 142 at a pressure, such that the eductor 142 increases the pressure of the anode exhaust by approximately 5 in$H_2$O.

While the FIGURES show a hybrid fuel cell system 100 including a fuel cell 102 and a turbine 130 operating together in tandem, with the turbine 130 providing air to the cathode 106 of the fuel cell 102 for operation of the fuel cell 102, it should be understood that the system 100 may be configured without the turbine 130. For example, other systems may be configured to provide air to the fuel cell 102, including another blower, which may provide air directly to the oxidizer 122. In such systems, the turbine loop 128 may operate with the blower rather than a turbine 130 in order to preheat the air received by the blower and supplied from the blower to the oxidizer 122.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in structures, shapes and proportions of the various elements, values of parameters, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell system, comprising:
a fuel cell, comprising:
an anode configured to receive anode feed gas and output anode exhaust; and
a cathode configured to receive cathode feed gas and output cathode exhaust;
a pressurizing assembly downstream from the anode; and
an oxidizer downstream from the anode;
wherein the cathode feed gas is the anode exhaust that has been compressed in the pressurizing assembly and reacted with air in the oxidizer.

2. The system according to claim 1, wherein the pressurizing assembly comprises a blower.

3. The system according to claim 1, wherein the pressurizing assembly comprises an eductor having an inlet end defining a nozzle, the inlet end configured to receive the anode exhaust and air, and an outlet end defining a diffuser.

4. The system according to claim 3, wherein the pressurizing assembly further comprising a blower configured to receive air from an air supply, compress or accelerate the air, and feed the compressed air to the nozzle of the eductor for mixture with the anode exhaust.

5. The system according to claim 3, further comprising a turbine defining a turbine inlet configured to receive and compress air from an air supply and a turbine outlet configured to output the air.

6. The system according to claim 5, wherein the nozzle of the eductor is configured to receive at least a portion of the air from the turbine outlet for mixture with the anode exhaust.

7. The system according to claim 5, wherein a slip stream of compressed air is output from the turbine inlet; and
wherein the nozzle of the eductor is configured to receive the slip stream for mixture with the anode exhaust.

8. The system according to claim 5, further comprising a turbine loop, comprising:
a low-temperature recuperator configured to receive air from the turbine inlet and transfer heat between the air and the cathode exhaust;
a heater configured to receive and heat the air from the low-temperature recuperator; and
a high-temperature recuperator configured to receive the air from the heater and transfer heat from the air to the cathode feed gas;
wherein the turbine outlet is configured to receive the air from the high-temperature recuperator.

9. The system according to claim 5, wherein:
at least a portion of the air output from the turbine outlet defines a bypass stream; and
the bypass stream is mixed directly with at least one of the cathode feed gas or the cathode exhaust.

10. A fuel cell system, comprising:
a fuel cell, comprising:
an anode configured to receive anode feed gas and output anode exhaust; and
a cathode configured to receive cathode feed gas and output cathode exhaust;
a blower configured to receive the anode exhaust from the anode and to compress or accelerate the anode exhaust; and
an oxidizer configured to receive the anode exhaust from the blower, react the anode exhaust with air, and output the cathode feed gas to the cathode.

11. The system according to claim 10, further comprising a turbine defining a turbine inlet configured to receive air from an air supply and a turbine outlet configured to output the air.

12. The system according to claim 11, wherein:
at least a portion of the air output from the turbine outlet defines a bypass stream; and
the bypass stream is mixed directly with at least one of the cathode feed gas or the cathode exhaust.

13. A method of balancing pressure between an anode and a cathode in a fuel cell, comprising:
providing a fuel cell having an anode outputting anode exhaust, and a cathode outputting cathode exhaust;
oxidizing the anode exhaust in the oxidizer to form a cathode feed gas;
increasing pressure of the anode exhaust or the cathode feed gas in a pressurizing assembly downstream from the anode; and
feeding the cathode feed gas to the cathode.

14. The method according to claim 13, wherein the pressurizing assembly is a blower.

15. The method according to claim 13, wherein the pressurizing assembly is an eductor having a nozzle at an inlet end and a diffuser at an outlet end; and further comprising:
feeding air and the anode exhaust to the nozzle;
mixing the air and the anode exhaust in the eductor; and
feeding the air and the anode exhaust from the eductor to an oxidizer.

16. The method according to claim 15, further comprising providing a turbine having a turbine inlet configured to receive air from an air supply and a turbine outlet configured to output air.

17. The method according to claim 15, further comprising feeding at least a portion of the air output from the turbine outlet to the nozzle.

18. The method according to claim 15, further comprising:
providing a blower;
feeding ambient air to the blower;
compressing or accelerating the ambient air in the blower;
feeding the air from the blower to the nozzle for mixture with the anode exhaust.

19. The method according to claim 15, further comprising feeding at least a portion of the air output from the turbine outlet directly to the oxidizer.

20. The method according to claim 15, further comprising:
outputting a portion of the air in the turbine inlet as a slip stream;
feeding the slip stream directly from the turbine inlet to the nozzle.

* * * * *